Sept. 11, 1962 R. AZAR 3,053,447
CALCULATOR
Filed Jan. 9, 1959 2 Sheets-Sheet 1
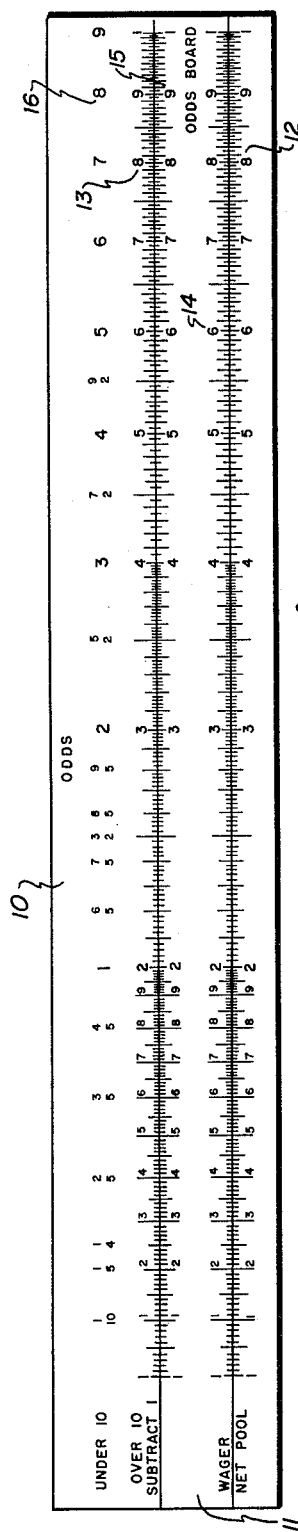
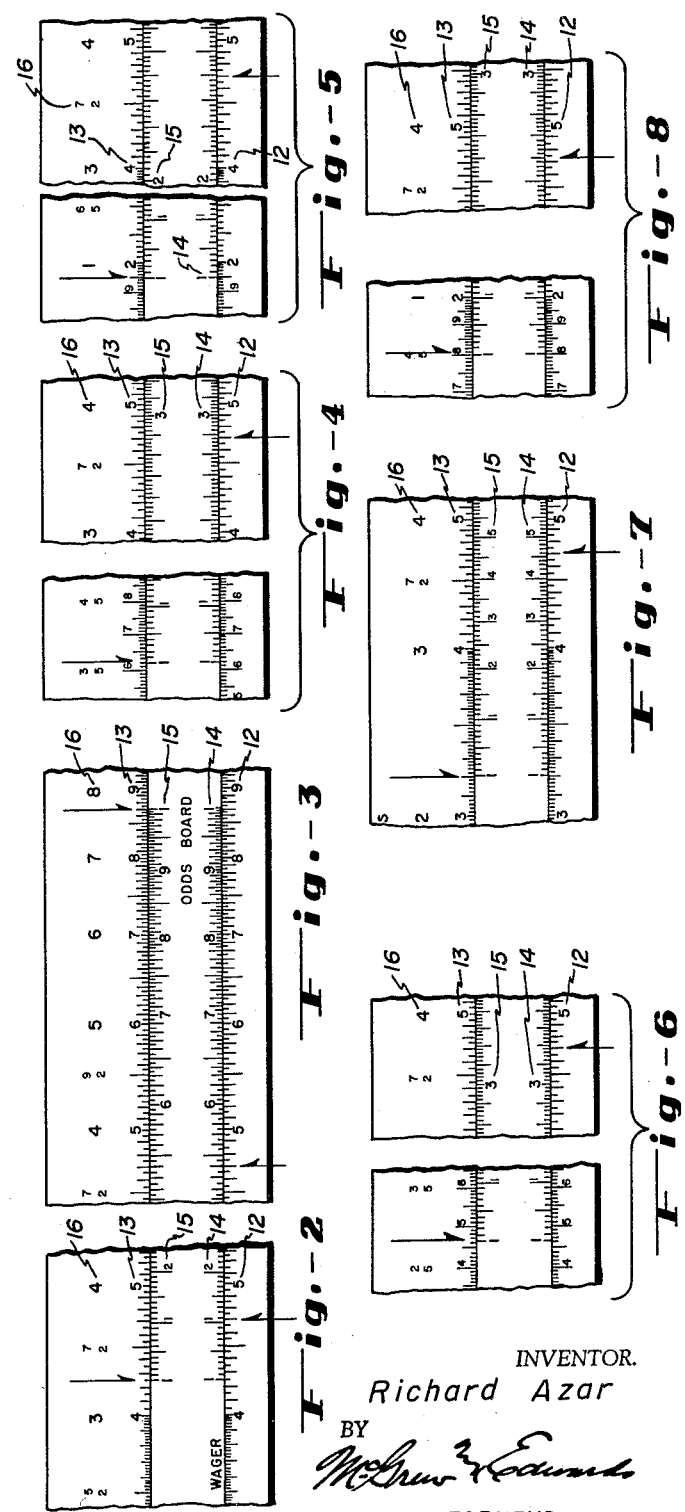
INVENTOR.
Richard Azar
BY
ATTORNEYS

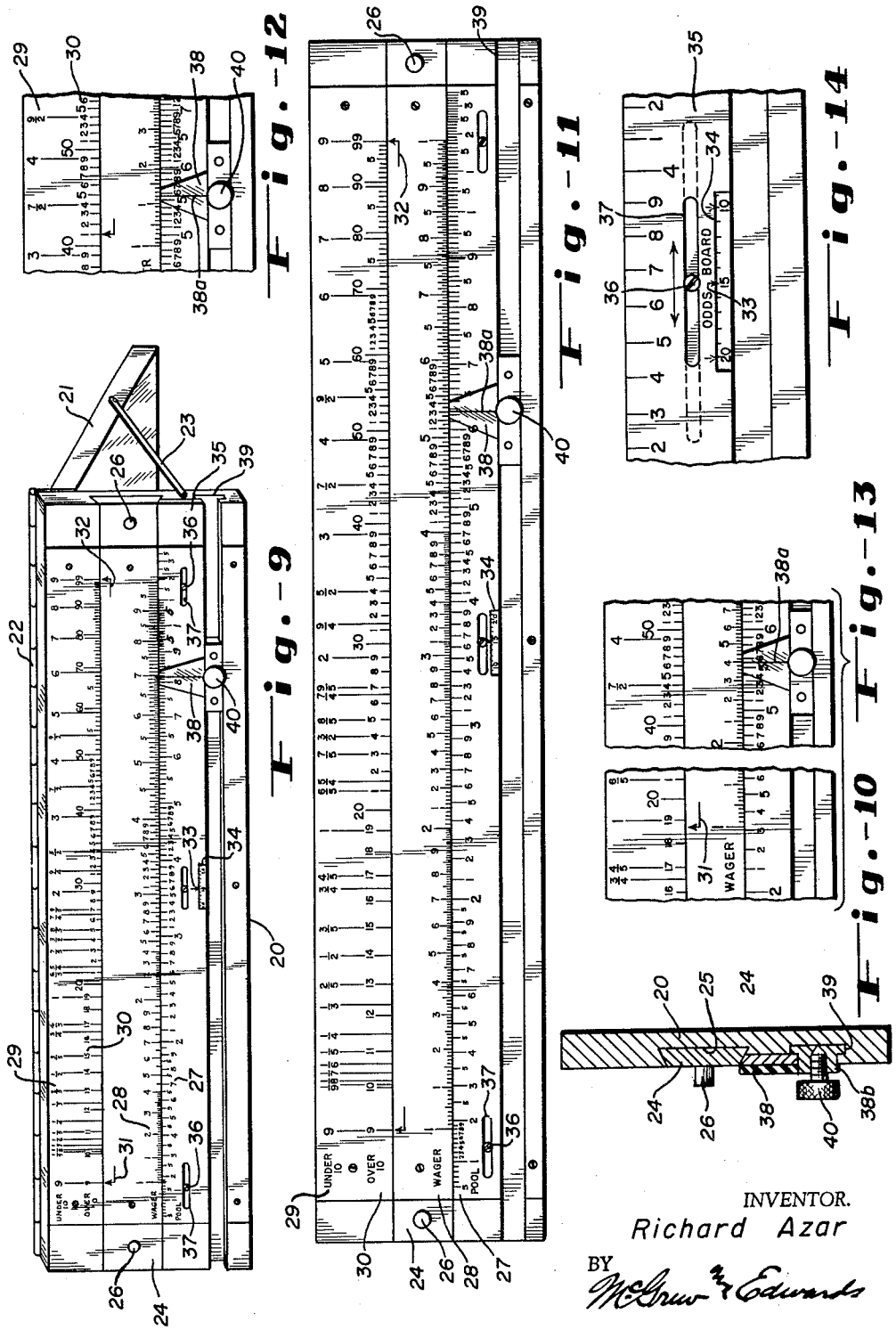

United States Patent Office 3,053,447
Patented Sept. 11, 1962

3,053,447
CALCULATOR
Richard Azar, Raton, N. Mex.
Filed Jan. 9, 1959, Ser. No. 785,921
3 Claims. (Cl. 235—70)

This invention relates to calculating devices and more particularly to an improved calculating device for the rapid determination of pari mutuel wagering odds at race tracks. This application is a continuation-in-part of a copending application of Richard Azar Serial No. 756,893, filed August 25, 1958, now abandoned.

At small race tracks such as those for horse and dog racing and which employ pari mutuel betting and in the absence of the pari mutuel machines, the determination and posting of the continuously changing odds poses a difficult problem. It has been the practice of the smaller tracks to hire persons who can make quick mental calculations of the odds and are experts in this field; these experts command a rather high salary although the accuracy of their calculations is not always as high as might be desired. Accordingly, it is an object of the present invention to provide an improved calculator for facilitating the rapid and accurate determination of pari mutuel odds at frequent intervals.

It is another object of this invention to provide an improved calculator for facilitating the rapid determination of pari mutuel odds and which may easily be adjusted to calculate odds involving different percentage values of track commissions and taxes.

Further objects and advantages of this invention will become apparent as the following description proceeds and the features of novelty which characterize the invention will be pointed out with particularity in the claims annexed to and forming a part of this specification.

Briefly, in carrying out the objects of this invention in one embodiment thereof a calculator of the type having relatively movable members is employed which, for example, may be of the slide rule type, and the calculator is provided with relatively movable logarithmic scales of the type commonly employed for the operations of multiplication and division. A separate scale stationary with respect to one of the movable scales is provided which is graduated in terms of odds over a limited range, say from zero through nine-to-one, and this scale is readable directly in odds. This makes possible a quick and accurate determination of the approximate odds over the range of odds most frequently occurring in race tracks.

In another embodiment a calculator is provided with scales similar to the first embodiment but on which the gross pool values are used directly and which may be set to adjust for the track commission and tax without separate calculations, this being accomplished by a relative adjustment of the scale positions.

For a better understanding of the invention reference may be had to the accompanying drawing in which:

FIG. 1 is a longitudinal plan view of a calculator of the slide rule type embodying the invention;

FIGS. 2 to 8, inclusive, are partial views of the calculator of FIG. 1 illustrating various calculations of odds made thereon;

FIG. 9 is an oblique projection view of another calculator embodying the invention;

FIG. 10 is a sectional view of the calculator taken along the line 10—10 of FIG. 9;

FIG. 11 is an enlarged view of the face of the calculator of FIG. 9;

FIGS. 12 and 13 are partial views of the calculator illustrating two positions of the slide during calculations; and FIG. 14 is an enlarged view of a portion of the calculator showing the scale adjustment.

Referring now to the drawings, the calculating device illustrated in FIG. 1 comprises a main body portion 10 and a relatively movable slide member 11 mounted within the body 10. The structural arrangement is essentially that of the slide rule. The member 10 is provided with logarithmic scales 12 and 13 arranged adjacent the slide 11 which is provided with registering scales 14 and 15, all of the scales 12, 13, 14 and 15 being identical logarithmic scales for effecting the operations of multiplication and division. A hair-line slide member (not shown) may be employed in the usual manner for slide rules; however, for purposes of the present device the slide member is not essential because extreme accuracy is not required and time may be saved by omitting the manipulation of the slide indicator. The scales 12 and 14 are marked "Net Pool" and "Wager," respectively, and the scale 13 has been marked "Over 10 Subtract 1."

As will be apparent from the illustrations given below, the scales 12 and 13 provide identical readings so that only one scale need be used; for purposes of clarity and speed in the operation of the slide rule it is preferred to provide two separate scales. The scale 15 in normal usage is employed only for the position of its end points; however, this scale can be used in cooperation with the scale 13 in the same manner as the scale 14 is employed in cooperation with scale 12, and for this reason the scale 15 has been shown in its complete form.

The calculating device with the relatively movable members as just described may be employed to calculate odds over the entire range of odds required for race track operation, it being necessary merely to divide the total net pool by the amount of the wager on the specific horse and to subtract one from the answer to determine the odds on that horse. The greatest number of odds during a race occurs in the range of odds from zero to ten-to-one and in the illustrated embodiment of this invention the calculation of odds within this range is greatly facilitated by the provision of a fourth scale indicated at 16 and which is a logarithmically divided scale marked in odds from 0 to 10-to-1 and is provided with fractional odds designations between the whole numbers from zero to five. In the rapid calculation of race track odds on pari mutuel systems it is then necessary merely to select the odds next below the answer secured by the operation of division on the scales 12 and 14, these being the odds appearing on the scale 16 opposite whichever of the right or left ends of the scale 15 is within the range of 0 to 10 on the scale 16.

For purpose of illustration let it be assumed that the pari mutuel odds are to be calculated in a seven-horse race in which the wagers on the horses are as follows:

| Horse number: | Wager |
|---|---|
| 1 | $1,122.00 |
| 2 | 543.00 |
| 3 | 2,925.00 |
| 4 | 240.00 |
| 5 | 318.00 |
| 6 | 147.00 |
| 7 | 256.00 |

With the above information the operator totals the wager and determines the gross pool to be $5,551.00. The track's commission and taxes must be deducted and, assuming this is 15%, $832.65 is subtracted from the gross to find the net pool of $4,718.34. The odds on all of the horses may now be calculated by employing the calculator of this invention.

The odds on the seven horses of the above table are then calculated in turn as indicated in FIGS. 2 through 8, respectively. When employing the calculator the operator places the amount of the wager of the first horse, that is, $1,122.00, over the amount of the net pool, $4,718.00, on the scales 14 and 12, respectively, of the calculator as indicated in FIG. 2. As indicated above, it is not necessary to place these figures precisely together on the scales 12 and 14 because the answer is sought in approximate odds. Thus, as shown in FIG. 2, the point 112 on scale 14 is only approximately over the point 4718 on the scale 12. The answer in odds is found immediately above the left end FIG. 1 of scale 15 on scale 16. The nearest approximate odds are 3-to-1, the 3 being the numeral immediately to the left of the arrow in the upper portion of the figure. The scale 16 is used since the odds obviously are less than 10-to-1 and hence are readable directly on the scale 16. The exact odds secured by division will be found to be 3.2-to-1, so that the calculations as secured on the rule are accurate within 20¢, which is well within the accuracy required for the practical operation of the pari mutuel tracks.

The calculation for the second horse is shown in FIG. 3 in which the wager on the second horse, $543.00, is placed approximately over the net pool, $4,718.00, as indicated by the lower arrow, and the answer on scale 16 falls between 7 and 8, as indicated by the upper arrow, making the approximate odds 7-to-1. In this case the exact odds are 7.65-to-1, a difference of 65¢, which is still within the required odds for pari mutuel operations.

The odds for the third horse are calculated in accordance with FIG. 4 wherein the total wager on the third horse, $2,925.00, is placed approximately over the net pool amount, as indicated by the lower arrow, and the odds are indicated by the upper arrow as 3-to-5. In this case the actual odds and approximate odds are in agreement, the actual odds being 60¢ to $1.00, which is a 3-to-5 ratio.

The calculation of the approximate odds for the fourth horse is shown in FIG. 5. Here the wager of $240.00 on the fourth horse is placed over the net pool, as indicated by the lower arrow in the right-hand portion of FIG. 5, and the odds are shown by the upper arrow on the left. In this case it is readily apparent that the odds are greater than 10-to-1 since $240.00 is less than 10% of the total net pool, and accordingly the odds are determined by scale 13 rather than scale 16 and, as shown by the upper arrow, the reading of scale 13 is approximately 19.5 and, subtracting 1, the nearest lower whole number is 18 and the odds are 18-to-1. The exact odds in this case are 18.65-to-1.

The calculations of the approximate odds for the fifth, sixth and seventh horses are indicated in FIGS. 6, 7 and 8, respectively. As shown in FIG. 6 the wager of $318.00 on the fifth horse is placed over the net pool as indicated by the lower arrow and the odds are determined by the reading on scale 13, the arrow indicating a point between 14 and 15 which upon subtraction of one point from the lower value gives the approximate odds as 13-to-1. The exact odds in this case are $13.80 to $1.00. Similarly, in FIG. 7 the wager of $147.00 on the sixth horse is placed directly over the net pool and on scale 13 gives a reading of 32 or approximate odds of 31-to-1, the exact figure being 31.05-to-1. In FIG. 8 the lower arrow indicates the placing of the wager of $256.00 on the seventh horse directly over the net pool, the reading on scale 13 as indicated by the upper arrow being just over 18 and the odds thus 17-to-1, the exact odds being 17.40-to-1. The ease with which these approximate odds may be calculated by the use of the calculating device just described greatly decreases the likelihood of errors either due to mental work of the operator or to the mechanical operation of the device.

It is obvious that if the odds are greater than 100-to-1 they be calculated by the use of the scale 13 in the same manner as those odds less than 100-to-1 by subtracting one from the result secured by dividing the total wager on the horse into the net pool.

The calculator illustrated and described above thus provides a means for very rapid calculation of approximate odds during the betting before the running of a race and provides an arrangement for the quick checking of the odds to secure the required approximate values with minimum risk of error due to mental operations.

Should it be desired to employ the usual slide indicator with the hair line as used on engineering slide rules, this indicator is preferably set at the reading for the net pool and is left in that position so that the total wager on each horse may be rapidly set approximately under the hair line and the other readings taken at the end of the movable slide, it being unnecessary to move the slide to the answer reading position in order to secure the required approximate odds.

The addition of the scale 16 to provide ready reading of the odds and fractional odds in values of 10-to-1 and less provides a very quick reading of these lower odds; this avoids the mental errors frequently made when it is attempted to increase the speed of calculation of the odds mentally.

In the embodiment of the invention illustrated in FIGS. 9 through 14, an arrangement of the calculator has been provided which makes it unnecessary to determine the net pool before proceeding with the calculation of the approximate odds. As illustrated in FIGS. 9 and 10, a calculator base or slide board 20 preferably constructed of light metal such as aluminum is provided with a cover 21 secured to the board by a piano hinge 22 extending along the rear edge thereof. When the cover is turned back as shown in FIG. 1, it may be latched in position by a detachable link 23 so that it provides a stand for holding the board on a table or other support in a position to facilitate its use without requiring it to be held by the operator. The board as illustrated in FIG. 9 may, for example, be about twenty inches long and seven inches wide; this provides scales sufficiently large to assure easy reading during the calculations.

A slide 24 corresponding to the slide 11 of the first modification is slidably mounted in a dovetail groove 25 in the base 20, and knobs 26 are provided which make it easy to move the slide from one side to the other. The face of the board 20 and the slide 24 are marked or engraved to provide four scales 27, 28, 29 and 30 indicated, respectively, by the legends "Pool," "Wager," "Under 10" and "Over 10," the scales 27, 29 and 30 being on the board and the scale 28 on the slide. In the operation of the calculator the amount of the wager on each horse on the scale 28 is located directly over the amount of the gross pool on the scale 27 and the odds are read on the appropriate one of the scales 29 or 30 opposite one of the arrows 31 or 32 at the left and right ends, respectively, of the slide 24.

The pool scale 27 is positioned or offset on the board in a manner to be described below so that only the gross pool need be employed, so that it is unnecessary for the operator to subtract the track commission and tax. In the illustrated embodiment, the pool scale has been set for a total commission and tax of 15%, as indicated at an arrow 33 opposite a slot 34 through which appears a scale bearing the numerals indicating 10%, 15% and 20%. The slot 34 is formed in a slidable member 35 attached by three screws 36 and extending through slots 37 so that the pool scale may be moved longitudinally relative to the position of the remaining scales. The screws 36 and slots 37 enable the bar 35 to be locked in selected percentage positions indicated by the arrow 33 and the scale in the window 34, this scale being marked on the exposed portion of the board 20 seen through the window or slot 34.

In order to facilitate the operation of the instrument, a transparent marker slide 38 is employed which may be locked with a hair line 38a directly over the amount of the gross pool so that it is available for calculating the odds for each horse in the race without danger of its being accidentally displaced. The slide 38 is mounted on a metal base 38b slidable in a slot or guide 39 in the board 20 and may be locked in position by a thumb screw 40. In the illustrated embodiment of the invention, a track commission and tax totaling 15% has been selected as the value when the slide 35 is flush at both ends of the board. The arrangement of the scales is clearly shown in the enlarged view of the face of the board, FIG. 11.

In order to illustrate the operation of the calculator, the fractional views (FIGS. 12 and 13) have been shown to illustrate the calculations for the odds of the first and fourth horses in the race example given above. As shown in FIG. 12, the gross pool ($5,551.00) is indicated by the hair line 38a and the wager on the first horse ($1,122.00) has been placed directly above the hair line. The arrow 31 is now to the right of the numeral 3 on the scale 29, indicating directly that the nearest approximate odds are 3-to-1. Thus a determination of the approximate odds is made without the necessity of first determining the net pool, it being clear that the odds for this horse are less than 10-to-1 as indicated in the previous calculation, so that the scale 29 rather than the scale 30 applies.

The odds for the fourth horse are then calculated as indicated in FIG. 13 by placing the wager ($240.00) directly over the hair line 38a and then reading the approximate odds opposite the left-hand arrow 31 on the scale 30, it being obvious that the odds are greater than 10-to-1. The odds on this horse are then indicated to be 18-to-1, the exact odds being 18.65-to-1, the same as they are in the example given in illustrating the first embodiment of the invention.

The manner in which the odds board may be changed for use with different total percentages of commission and taxes is indicated in FIG. 14, which is an enlarged view of the center portion of the strip 35 wherein the percentage scale appears through the opening 34 at the edge of the strip 35. Should the total of the track commission and taxes be greater than 15%, say 20%, the screws 36 are loosened and the slide 35 moved to the left until the arrow 33 is directly over the numeral 20 on the scale within the window 34. In a similar manner, if the total percentage is lower, the slide 35 is moved to the right until the amount, say 10%, appears directly below the arrow 33. The effect of this movement is to subtract automatically the amount of the commission from the gross pool as set on the scale 27, making it unnecessary for the operator to make this calculation mentally.

It will be noted on FIG. 11 that when the scales 27 and 28 are in their normal positions of registry with the ends of the slide 24 flush with the ends of the board as illustrated in this figure, the numeral 8.5 (or 85) appears directly above the right-hand numeral 1 on the scale 27, this numeral having been moved to the left from its usual position at the right end of the scale in registry with the numeral 1 at the right end of the scale 28. The difference between 85 and 100 is of course the 15% difference due to the subtraction of the amount of commission and taxes.

When the total of commission and taxes is 20% and the slide 35 has been moved to the left and locked with the arrow 33 over the numeral 20, the numeral 1 on the scale 27 will be directly below the numeral 8 (or 80) on the scale 28 when the slide 24 is in its flush or neutral position. In a similar manner, when the slide 35 is moved to the right and locked with the arrow 33 over the numeral 10, the numeral 9 (or 90) will be directly above the numeral 1 on the scale 27 in its flush or neutral position. Obviously percentages between 10 and 20 may be selected according to the scale indicated within the window 34.

The embodiment of the invention illustrated in FIGS. 9 through 14 thus provides a simplified arrangement for effectively calculating approximate odds without the necessity of making calculations for the subtraction of the commission and tax from the gross pool. The percentage of commission and tax will of course remain constant for any series of calculations since it is fixed by the track at which the board is being used. Therefore, it is necessary merely to move the slide 35 to the particular track's total percentage of commission and taxes and then lock it in place for all uses at that track.

While the invention has been described in connection with specific forms of slide rule, other modifications and adaptations may be made, and it is intended by the appended claims to cover all modifications which fall within the spirit and scope of the invention.

I claim:
1. A calculator comprising a base member, a slide supported for limited longitudinal adjustment on said base member and having a logarithmic scale thereon, a longitudinally adjustable member mounted on said base member, a second logarithmic scale positioned on said longitudinally adjustable member adjacent to said first-mentioned scale for cooperation therewith in performing divisions of numbers, a third scale on said base member oriented relative to said first-mentioned logarithmic scale and calibrated to indicate quotients of said divisions reduced by a constant representing odds, an index on said longitudinally adjustable member cooperating with said third scale to indicate the odds, and means for adjusting said slide for offsetting the position of said first-mentioned logarithmic scale with respect to said third scale by an amount representing a percentage deduction to be made from the dividend of said divisions.

2. A calculator as set forth in claim 1 including scale means and an index mounted, one on said base member and one on said slide, for indicating the percentage deduction from the dividend.

3. A calculator as set forth in claim 1 wherein said means for adjusting said slide provides for selectively offsetting the position of said first-mentioned logarithmic scale with respect to said third scale and is provided with means for locking said slide in the selected offset position.

References Cited in the file of this patent

UNITED STATES PATENTS

| | | |
|---|---|---|
| 766,009 | Winslow | July 26, 1904 |
| 944,218 | Sommer | Dec. 21, 1909 |
| 1,488,686 | Keuffel | Apr. 1, 1924 |
| 1,599,582 | Moyer | Sept. 14, 1926 |
| 2,392,877 | Pym | Jan. 15, 1946 |
| 2,563,512 | Bock | Aug. 7, 1951 |